US012395786B2

(12) United States Patent
Ye et al.

(10) Patent No.: US 12,395,786 B2
(45) Date of Patent: Aug. 19, 2025

(54) LOUDSPEAKER

(71) Applicant: Harman Becker Automotive Systems GmbH, Karlsbad (DE)

(72) Inventors: Xipeng Ye, SIP.Suzhou (CN); Xin Liu, SIP.Suzhou (CN); Andreas Helmut Pfeffer, Wenzenbach (DE); Richard Josef Kralik, Petershausen (DE)

(73) Assignee: Harman Becker Automotive Systems GmbH, Karlsbad-Ittersbach (DE)

( * ) Notice: Subject to any disclaimer, the term of this patent is extended or adjusted under 35 U.S.C. 154(b) by 212 days.

(21) Appl. No.: 18/080,139

(22) Filed: Dec. 13, 2022

(65) Prior Publication Data

US 2023/0217156 A1 Jul. 6, 2023

(30) Foreign Application Priority Data

Dec. 30, 2021 (EP) ..................................... 21218311

(51) Int. Cl.
*H04R 1/28* (2006.01)
*H04R 1/02* (2006.01)
*H04R 9/06* (2006.01)

(52) U.S. Cl.
CPC ........... *H04R 1/2834* (2013.01); *H04R 1/025* (2013.01); *H04R 9/066* (2013.01); *H04R 2400/11* (2013.01)

(58) Field of Classification Search
CPC ...... H04R 1/2834; H04R 1/025; H04R 9/066; H04R 2400/11; H04R 1/2826; H04R 7/20; H04R 7/26; H04R 9/022; H04R 9/06; H04R 2209/026; H04R 2499/13; H04R 1/26; H04R 19/02; H04R 1/021; H04R 1/323; H04R 1/2807; H04R 1/28; H04R 1/227; G06F 3/16
See application file for complete search history.

(56) References Cited

U.S. PATENT DOCUMENTS

| | | | | | |
|---|---|---|---|---|---|
| 4,805,221 | A * | 2/1989 | Quaas | H04R 1/227 181/171 |
| 5,629,502 | A | 5/1997 | Nakano | |
| 8,737,659 | B2 * | 5/2014 | Suzuki | H04R 1/2834 381/337 |
| 10,484,788 | B1 | 11/2019 | Kudekar | |
| 11,218,797 | B2 * | 1/2022 | Prokisch | H04R 1/2803 |
| 11,849,297 | B2 * | 12/2023 | Tiene | H04R 1/2896 |
| 2004/0105565 | A1 * | 6/2004 | Butters | H04R 1/2834 381/345 |
| 2006/0147076 | A1 * | 7/2006 | Hoffmann | H04R 1/345 381/337 |

(Continued)

FOREIGN PATENT DOCUMENTS

| | | | | |
|---|---|---|---|---|
| CN | 213365496 U * | 6/2021 | G06F 3/16 |
| EP | 1791389 B1 | 11/2016 | |

(Continued)

*Primary Examiner* — Angelica M McKinney
(74) *Attorney, Agent, or Firm* — Angela M. Brunetti

(57) ABSTRACT

A loudspeaker comprises a first diaphragm, a second passive diaphragm, and a drive unit coupled to the first diaphragm. The drive unit is configured to drive the first diaphragm in a direction of excursion upon applying electrical energy to the drive unit. The second passive diaphragm is arranged opposing the first diaphragm. The second passive diaphragm is mainly driven by sound waves emitted from the first diaphragm.

18 Claims, 2 Drawing Sheets

(56) References Cited

U.S. PATENT DOCUMENTS

| | | | | |
|---|---|---|---|---|
| 2008/0205682 | A1 | 8/2008 | Jenkins | |
| 2009/0316933 | A1 | 12/2009 | Koyama | |
| 2013/0195311 | A1* | 8/2013 | Sahyoun | H04R 1/2834<br>381/398 |
| 2017/0013352 | A1* | 1/2017 | Shihuang | H04R 1/323 |
| 2018/0270567 | A1* | 9/2018 | Litovsky | H04R 1/26 |
| 2020/0068281 | A1 | 2/2020 | Chu | |
| 2020/0329301 | A1 | 10/2020 | Prokisch | |
| 2022/0225017 | A1* | 7/2022 | Tabata | H04R 1/021 |
| 2023/0188895 | A1* | 6/2023 | Tiene | H04R 19/02<br>381/349 |

FOREIGN PATENT DOCUMENTS

| | | | | |
|---|---|---|---|---|
| JP | H10341492 | A | 12/1998 | |
| WO | WO-2020129262 | A1 * | 6/2020 | H04R 1/28 |
| WO | WO-2020199132 | A1 * | 10/2020 | H04R 1/2807 |

* cited by examiner

LOUDSPEAKER

CROSS REFERENCE

Priority is claimed to application serial no. 21218311.5, filed Dec. 30, 2021 in Europe, the disclosure of which is incorporated in its entirety by reference.

TECHNICAL FIELD

The present disclosure relates to the field of loudspeakers, for example to the field of midrange speakers and bass speakers, so-called woofers, with a compact design.

BACKGROUND ART

Loudspeakers are widely used in various areas, for example in consumer products like radios, television sets, audio players, computers, mobile phones and electronic musical instruments, and commercial applications, for example sound reinforcement in theatres, concert halls, and public address systems. Furthermore, in vehicles, for example planes, ships and cars, loudspeakers are widely used.

A loudspeaker may comprise a diaphragm (also called membrane) which is driven by a drive unit (also called electromagnetic motor system) for generating acoustic waves. The drive unit may comprise for example a magnet, in particular a permanent magnet, and a voice coil coupled to the diaphragm and arranged in a magnetic field provided by the magnet. An outer edge of the diaphragm may be elastically coupled via a suspension (also called surround) to a frame (also called basket) of the loudspeaker. For example, the voice coil may be a coil of wire capable of moving axially in a cylindrical gap containing a concentrated magnetic field produced by the permanent magnet. When an alternating electrical current of for example an electrical audio signal is applied to the voice coil, the voice coil is forced to move back and forth due to the Faraday's law of induction, which causes the diaphragm attached to the voice coil to move back and forth, pushing on the air to create sound waves. The voice coil may be elastically coupled to the frame of the loudspeaker, e.g. via a so called "spider". Arrangement and properties of the magnet and voice coil may affect characteristics of the loudspeaker. Characteristics of a loudspeaker may relate to efficiency, i.e. the sound power output divided by the electrical power input, sensitivity, i.e. the sound pressure level at for example 1 W electrical input measured at 1 meter, linearity or frequency response, maximum acoustic output power, size and weight. Characteristics may be different for different frequencies, for example small loudspeakers may have lower efficiency at low frequencies than large loudspeakers.

In particular in cars a plurality of loudspeakers may be arranged at different locations to provide adequate sound output for each occupant. For example, loudspeakers may be arranged in the dashboard, doors, ceiling, seats and headrests. Small loudspeakers may have better high frequency response. Large loudspeakers and volumes can be advantageous for generating low frequencies. In particular midrange loudspeakers and bass loudspeakers may require large installation space. However, installation space may be sparse in the car.

SUMMARY

In view of the above, there is a need in the art to improve at least some of the above characteristics of a loudspeaker. For example, there is a need for compact sized light weighted loudspeakers providing high efficiency, in particular at low frequencies.

According to the present disclosure, a loudspeaker as defined in the independent claim is provided. The dependent claims define embodiments.

According to various examples, a loudspeaker comprises a first diaphragm and a drive unit coupled to the first diaphragm. The drive unit is configured to drive the first diaphragm in a direction of excursion upon applying electrical energy to the drive unit. The loudspeaker comprises a second passive diaphragm arranged opposing the first diaphragm. The second diaphragm is on one hand excited by sound waves emitted from the first diaphragm. On the other hand, a main driving force for the second diaphragm may be a pressure difference in a (small) enclosure (in the following also designated as chassis) in which the first and second diaphragms are arranged. An interplay of pressure variation and emitted soundwaves may make such arrangement especially efficient. For example, no drive unit may be associated with the second passive diaphragm, i.e. no drive unit is directly coupled to the second passive diaphragm. However, in other embodiments, at least a voice coil or a carrier of a voice coil may be associated with the second passive diaphragm, i.e. the associated voice coil or carrier may be directly coupled to the second passive diaphragm. However, such associated voice coil may not be energized, for example it may not be electrically connected to electrical components outside the loudspeaker. As a result, the second passive diaphragm is only or at least essentially only driven by sound waves emitted from the first diaphragm. In particular, the second passive diaphragm may not be driven directly by an electromagnetic force. By arranging the second passive diaphragm opposing the first diaphragm, a direction of excursion of the second passive diaphragm may be parallel to the direction of excursion of the first diaphragm.

In various examples, the second passive diaphragm is arranged spaced apart from the first diaphragm. A distance between the second passive diaphragm and the first diaphragm may be at least 10 mm. A distance between the second passive diaphragm and the first diaphragm may be at most 300 mm.

An outer circumference of the first diaphragm may extend in a first plane. An outer circumference of the second passive diaphragm may extend in a second plane. The first plane may be parallel with respect to the second plane, at least essentially parallel. However, in other examples, the first plane may be slightly tilted with respect to the second plane, for example, an angle between the first plane and the second plane may be in a range of up to 5 or 40 degrees. The outer circumference of the first diaphragm may be offset from the outer circumference of the second passive diaphragm along the direction of excursion.

For example, the first diaphragm may have a dome, cone or spherical shape with the base of the dome/cone/spherical shape extending in the first plane perpendicular to the direction of excursion. The second passive diaphragm may also have a dome shape, cone shape or spherical shape with the base of the dome/cone/spherical shape extending in the second plane perpendicular to the direction of excursion. An apex of the dome/cone/spherical shape of the first diaphragm may be outside the area between the first and second planes, and an apex of the dome/cone/spherical shape of the second passive diaphragm may be outside the area between the first and second planes also. I.e., the first diaphragm and the second passive diaphragm may face each other.

The above described shape of the first and second diaphragms is an example only and the first and second diaphragms may have any other shape, for example a conical shape, a flat disk shape, a spherical shape, a dome shape, a horn shape, a funnel shape or a combination thereof. Each of the first and second diaphragms may be made from one piece or assembled from several pieces, which are made of the same material or of different materials.

Furthermore, the second passive diaphragm may be arranged with respect to the first diaphragm such that a projection of the second passive diaphragm along the direction of excursion at least partially overlaps the first diaphragm. For example, dimensions of the outer circumference of the first diaphragm may be the same as dimensions of the outer circumference of the second passive diaphragm, i.e. the first diaphragm and the second passive diaphragm may have the same shape and size. They may be aligned along the direction of excursion such that they face each other.

As a result, a direct and short traveling path for soundwaves emitted by the first diaphragm in the direction of the second passive diaphragm may be established such that the second passive diaphragm may be driven by sound waves emitted by the first diaphragm. Furthermore, the second diaphragm may be driven or excited by pressure variation in the enclosure (chassis) in which the first and second diaphragms are arranged. The second passive diaphragm may in particular oscillate at a resonance frequency thus increasing acoustic output power of the loudspeaker and increasing the efficiency of the loudspeaker assembly. As the second passive diaphragm does not include a drive unit, in particular no magnet assembly, cost, weight and energy consumption may be reduced.

The second passive diaphragm may comprise, at or near a center of the second passive diaphragm, a weight element. For example, the weight element may comprise a ring-shaped element made of plastic and/or metal. The mass of the weight element may adjust a resonance frequency of the second passive diaphragm. A larger mass may lower the resonance frequency, a smaller mass may higher the resonance frequency. The loudspeaker may be installed in a closed enclosure without bass reflex opening, e.g. no bass reflex tube, thus avoiding flow noise at such opening. However, in other examples, the loudspeaker may be installed in an enclosure with a bass reflex opening (bass reflex vent).

In various examples, the loudspeaker comprises a chassis supporting the first diaphragm, the second passive diaphragm and the drive unit. For example, the first diaphragm may be mounted to the chassis via a first elastic surround supporting the first diaphragm in a rest position, and the second passive diaphragm may be mounted to the chassis via a second elastic surround supporting the second passive diaphragm in a rest position. Both, the first diaphragm and the second passive diaphragm, may be movable in the direction of excursion against a restoring force of the first elastic surround and the second elastic surround, respectively.

A usual loudspeaker comprising a single diaphragm may have a so-called basket as chassis for keeping the diaphragm and the drive unit in position. Further components may be provided, for example a surround arranged between an outer circumference of the diaphragm and the basket as well as a so-called spider arranged between a voice coil of the drive unit and the basket. As such, the chassis of the loudspeaker of the present disclosure may be considered as a first basket supporting the first diaphragm via the first elastic surround and the drive unit, and a second basket supporting the second passive diaphragm via the second elastic surround. The first basket and the second basket may be coupled to each other via a wall element extending in the direction of excursion and surrounding an outer circumference of the first and second elastic surrounds.

The chassis may provide a sound outlet aperture. For example, the sound outlet aperture may be formed as a hole in the wall element connecting the first and second baskets. An outer circumference of the sound outlet aperture may extend in a plane parallel to the direction of excursion. In other words, the sound outlet aperture may be arranged perpendicular to the first and second planes of the diaphragms. As a result, the main sound radiation direction of the loudspeaker is perpendicular to the first and second planes in which the first and second diaphragms are arranged.

In further examples, the chassis, the first diaphragm and the second passive diaphragm form a closed surface which circumscribes the sound outlet aperture. In other words, the sound outlet aperture is the only opening for sound radiation. Flow noise at other openings may be avoided. Furthermore, efficient control of the second passive diaphragm by soundwaves emitted by the first diaphragm may be achieved.

According to various examples of, the outer circumference of the first diaphragm has an oval shape. Accordingly, the outcome circumference of the second passive diaphragm may also have an oval shape. Using an oval shape for the first and second diaphragms enables a flat design of the loudspeaker such that the loudspeaker may be used in loudspeaker systems for wall mounting or in a door of a vehicle, e.g. a car, where small dimensions in the direction of sound radiation are desired.

According to further examples, a loudspeaker system is provided. The loudspeaker system comprises a housing and the above described loudspeaker. The housing's design may play an important acoustic role thus determining the resulting sound quality. For example, the housing may provide a sound outlet aperture. The housing may have a closed surface which circumscribes the sound outlet aperture of the housing. An edge of the sound outlet aperture of the housing may be coupled to an edge of the sound outlet aperture of the loudspeaker. As the direction of excursion of the first and second diaphragms is perpendicular to the main direction of sound radiation through the sound outlet aperture, dimensions of the housing in the direction of sound radiation may be small. The housing may have a volume in a range of a few liters, for example 1 to 10 liters, for example a volume of 3 liters.

In some examples, an edge of the sound outlet aperture of the housing may be coupled to an edge of a sound outlet aperture of the loudspeaker via an elastic sealing element providing an airtight sealing between the edge of the sound outlet aperture of the housing and the edge of the sound outlet aperture of the loudspeaker. The airtight sealing in combination with the closed surface of the housing may support that the passive second diaphragm is driven by a pneumatic force generated by the first diaphragm The loudspeaker may be elastically mounted at the housing. For example, the loudspeaker may be coupled to the housing via rubber grommets and a rubber ring at the sound outlet. The elastic mounting may contribute to avoid clattering noise and resonance noise.

In further examples, the housing is configured to be mountable at a vehicle component, for example at a door interior lining or door panel. As the direction of excursion of the first and second diaphragms is perpendicular to the main direction of sound radiation, requirements concerning a stiffness of the front wall of the housing in which the sound outlet aperture is provided may be low. For example, a vehicle component may form at least a part of the housing, for example the door panel may form at least a part of the front wall surrounding the sound outlet aperture of the loudspeaker. Cost and weight reduction may be achieved.

It is to be understood that the features mentioned above and those described in detail below may be used not only in the described combinations, but also in other combinations or in isolation.

DETAILED DESCRIPTION OF EMBODIMENTS

Figure 1:
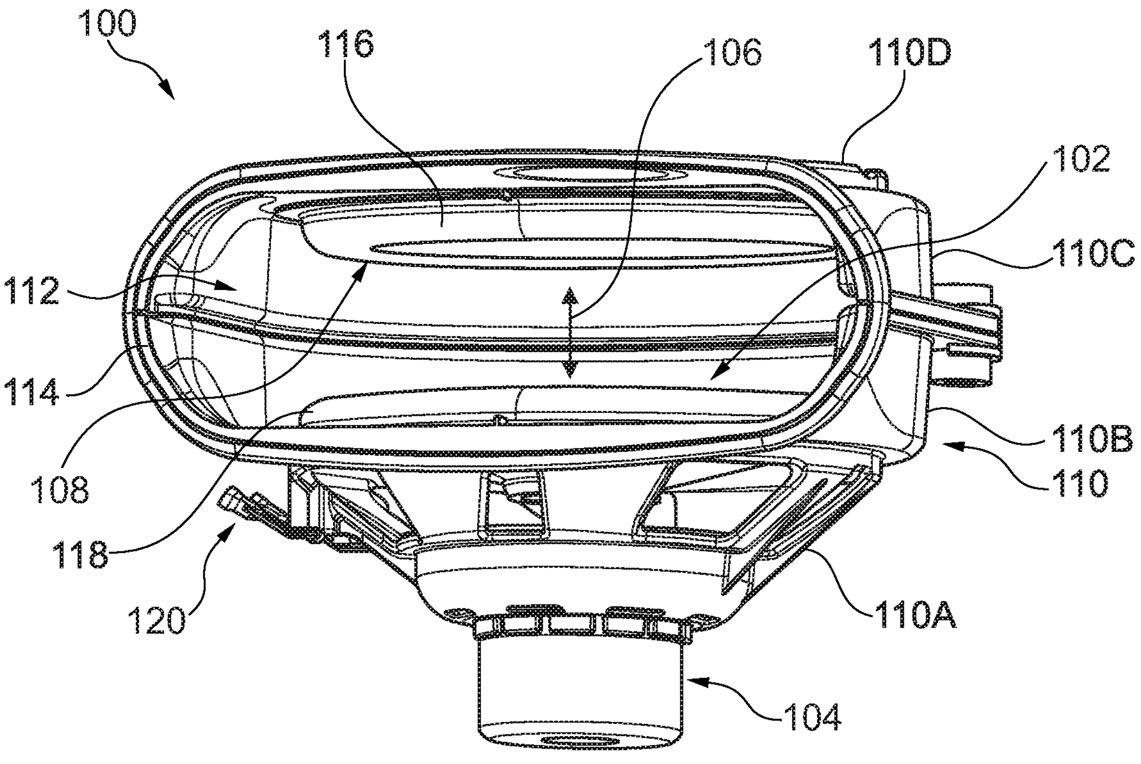
FIG. 1 schematically illustrates a perspective view of a loudspeaker according to various examples.

In the following, embodiments will be described in detail with reference to the accompanying drawings. It is to be understood that the following description of embodiments is not to be taken in a limiting sense. The scope of this disclosure is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, components, or other physical or functional units shown in the drawings or described herein may also be implemented by an indirect connection or coupling.

Some examples of the present disclosure generally provide for a plurality of mechanical and electrical components. All references to the components and the functionality provided by each are not intended to be limited to encompassing only what is illustrated and described herein. While particular labels may be assigned to the various components disclosed, such labels are not intended to limit the scope of operation for the components. Such components may be combined with each other and/or separated in any manner based on the particular type of implementation that is desired.

FIG. 1 shows a perspective view of a loudspeaker 100. The loudspeaker 100 comprises a chassis 110 in which a first diaphragm 102 and a second diaphragm 108 are arranged face to face. The chassis 110 may comprise a first basket 110A at which the first diaphragm 102 is mounted via a first surround 118. At a second basket 110D (only partially shown in FIG. 1) of the chassis 110 the second diaphragm 108 is mounted via a second surround 116. The chassis 110 may be made of any appropriate material, for example plastics, resin, metal like aluminum or steel or a composite material including carbon or glass fibers.

The first diaphragm 102 is coupled to a drive unit 104 which is mounted at the first basket 110A. The drive unit 104 is configured to drive the first diaphragm 102 in a direction of excursion 106 upon applying electrical energy to the drive unit 104. The drive unit 104 may comprise for example a voice coil and a magnet assembly as will be described below in more detail in connection with the FIG. 2. Electrical energy may be applied to the voice coil via basket terminals 120. As shown in FIG. 1, the second diaphragm 108 is arranged opposing the first diaphragm 102 in the direction of excursion 106. The second diaphragm 108 is not directly driven by any electromagnetic force. The second diaphragm 108 is not directly coupled with any drive unit. Therefore, the second diaphragm 108 is a passive diaphragm which may be driven by sound waves emitted from the first diaphragm and/or by pressure differences inside the chassis 110. In the following, the second diaphragm 108 will also be called "second passive diaphragm 108".

A distance between the first and second diaphragms 102, 108 in the direction of excursion 106 may be in a range of a few centimeters, for example in a range of 1 to 30 cm. The first and second diaphragms 102, 108 may have a circular or an oval shape. A diameter or length of the first and second diaphragms 102, 108 may be in a range of 5 to 30 cm. The first and second diaphragms 102, 108 may have essentially the same dimensions and they may be aligned to each other such that the shape of the second diaphragm 108 may be projected along the direction of excursion 106 on the shape of the first diaphragm 102.

The first basket 110A and the second basket 110D are interconnected to each other via a wall element of the chassis 110. The wall element may comprise for example a lower wall element 110B and an upper wall element 110C. The first basket 110A and the lower wall element 110B may be formed as an integrated part. The second basket 110D and the upper wall element 110C may be formed as an integrated part. In an assembled state, the lower wall element 110B and the upper wall element 110C provide a wall surrounding a space between the first and second diaphragms 102, 108, at least partially. The wall elements 110B and 110C extend in a circumferential direction around the space between the first and second diaphragms 102, 108, and in the direction of excursion 106. In the wall formed by the wall elements 110B and 110C an aperture 112 is provided.

However, the wall elements 110B and 110C may be optional and the first basket 110A and the second basket 110D may be arranged in a housing (e.g. the housing 204 described below) or coupled by a spacer such that the first diaphragm is arranged opposing the second diaphragm 108.

As shown in FIG. 1, the first and second diaphragms 102, 108 may each have an oval form and the aperture 112 may be provided along the long side of the oval form. For example, a length of the aperture 112 in the direction perpendicular to the direction of excursion 106 may essentially correspond to the length of the oval diaphragms 102, 108. A height of the aperture 112 may essentially correspond to the distance between the first and second diaphragms 102, 108. An outer circumference 114 of the aperture 112 may extend in a plane parallel to the direction of excursion 106 and parallel to the length of the oval form of the first and second diaphragms 102, 108. The aperture 112 may be essentially the only opening to the space between the first and second diaphragms 102, 108. In other words, the chassis 110 in combination with the surroundings 116, 118 and the diaphragms 102, 108 may essentially enclose the space between the diaphragms 102, 108 completely, apart from the aperture 112. Sound generated in the space between the first and second diaphragms 102, 108, i.e. the sound generated within the chassis 110, may be radiated essentially through the aperture 112 only. Thus, the aperture 112 is acting as a sound outlet aperture 112 of the loudspeaker 100.

When the drive unit 104 is energized with electrical energy, for example an electrical signal representing a sound signal, the first diaphragm 102 is moved back and forth along the direction of excursion 106 thus emitting sound waves. The sound waves may at least partially propagate along the direction of excursion 106 and may be incident on the second passive diaphragm 108. The sound waves incident on the second passive diaphragm 108 may move the second passive diaphragm 108 along the direction of excursion 106.

At certain frequencies or frequency ranges resonance may occur such that the sound radiated from the first diaphragm 102 is amplified by the second passive diaphragm 108, resulting in an increased sound power output at the aperture 112. In particular, low-frequency performance of the loudspeaker 100 may be improved. Since no drive unit is provided for the second passive diaphragm 108, additional costs are incurred only for the second passive diaphragm 108. In addition, the weight of the loudspeaker 100, i.e. the whole transducer assembly, can be kept low.

Figure 2:
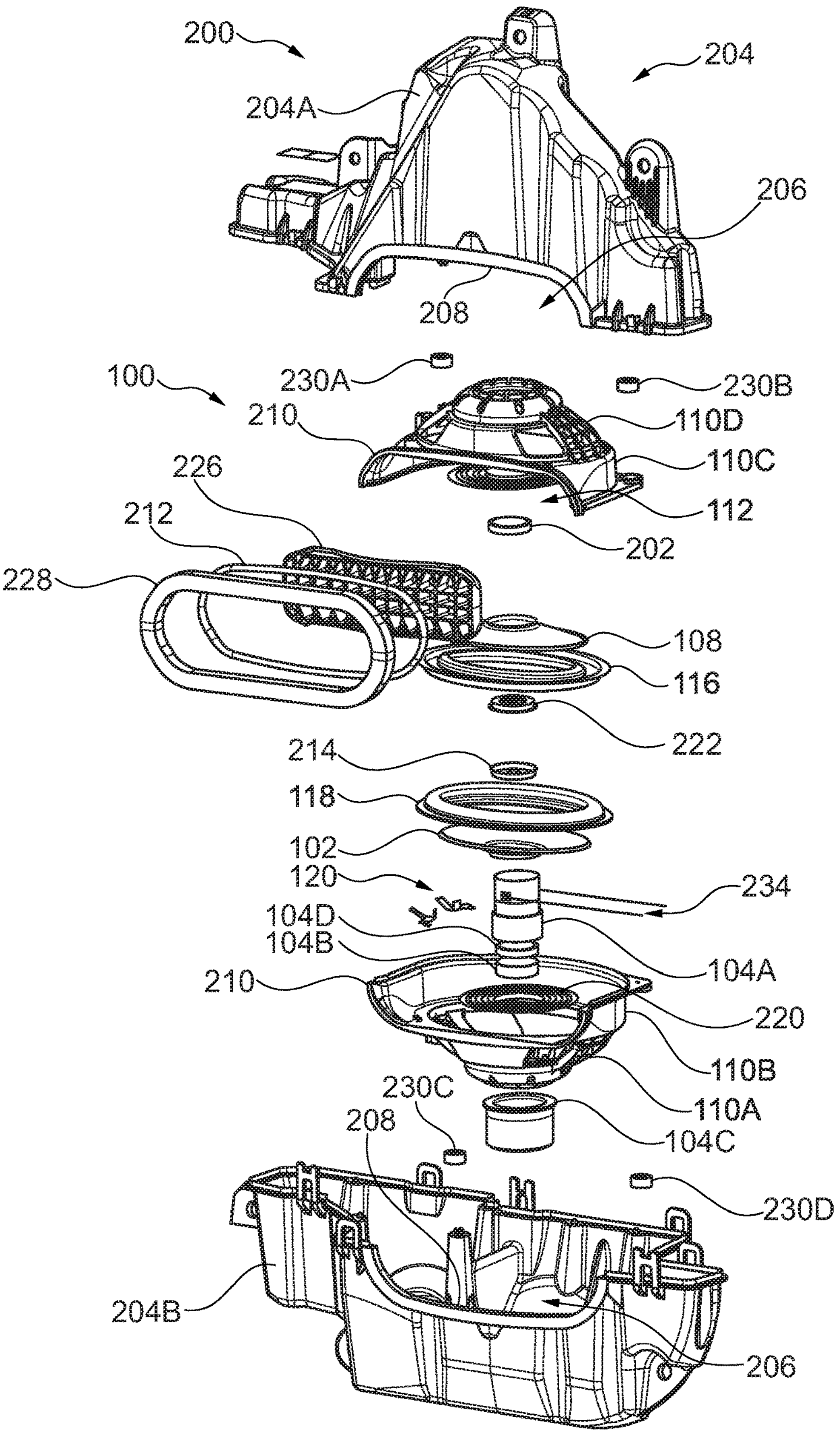
FIG. 2 schematically illustrates an exploded perspective view of a loudspeaker system according to various examples.

FIG. 2 shows an exploded perspective view of a loudspeaker system 200 comprising the above described loudspeaker 100.

As described above, the loudspeaker 100 comprises the first diaphragm 102 and the second passive diaphragm 108. Each of the diaphragms 102, 108 has an oval shape.

The first diaphragm 102 is coupled to the drive unit 104A-D comprising a voice coil 104A and a magnet 104B, i.e. the first diaphragm 102 may be directly controlled by electrical energy provided to the voice coil 104A. The drive unit 104 may comprise further components, for example a core cap 104D and a so-called shell pot 104C which accommodates the magnet 104B and the voice coil 104A. Between the shell pot 104C and the magnet 104B an annular gap may be formed in which the voice coil 104A is arranged movably in the direction of excursion 106. As an alternative, the drive unit 104 may be equipped with a ring neo motor instead of the shell pot 104C.

The magnet 104B may comprise a permanent magnet comprising ferromagnetic materials, for example iron, nickel, cobalt and/or neodymium. The magnet 104B may be a hollow cylindrical magnet, a so-called ring magnet, or a disk-shaped magnet.

The voice coil 104A may comprise a tubular carrier on which a plurality of coil windings of conductive wire is provided. End sections 234 of the conductive wire are coupled to the basket terminals 120. The tubular carrier may be made of a non-magnetic material, for example paper, aluminum or plastics, like polyimide, for example Kapton. An inner diameter of the carrier may be larger than an outer diameter of the magnet 104B. An outer diameter of the coil windings may be smaller than an inner diameter of the shell pot 104C. The voice coil 104A is movable in the direction of excursion in the up and down directions in FIGS. 1 and 2.

A disc-shaped elastic element 220 may be provided between the voice coil 104A and the first basket 110A. The elastic element 220, which is also called "spider", may be configured to allow a movement of the voice coil 104A in the direction of excursion 106 and to inhibit any movement of the voice coil 104A perpendicular to the direction of excursion 106.

Electrical energy may be applied to the voice coil 104A via basket terminals 120 such that the voice coil 104A generates a magnetic field which moves the voice coil 104A together with the first diaphragm 102 in the direction of excursion 106A upon interaction with a magnetic field from the magnet 104B. As a result, the first diaphragm 102 can be deflected by energizing the voice coil 104A.

A center hole of the first diaphragm 102 may be covered with a dust cap 214.

In FIG. 2, the second passive diaphragm 108 is arranged above and opposing to the first diaphragm 102. The second passive diaphragm 108 may have essentially the same shape and dimensions as the first diaphragm 102. For covering a center opening in the second passive diaphragm 108, a corresponding dust cap 222 may be provided.

The second passive diaphragm 108 may comprise, at or around a center of the second passive diaphragm 108, a weight element 202. The weight element 202 may have a washer or disk shape. The weight element 202 changes the mass of the second passive diaphragm 108. The resonance frequency of the second passive diaphragm 108 depends on the mass. The mass of the weight element 202 may be selected according to the application of the loudspeaker 100 to provide a required resonance frequency. The weight element 202 may have a mass in the range of a few grams, for example in a range of 1 to 200 grams, for example 18 grams.

The loudspeaker system 200 comprises a housing 204, in which the loudspeaker 100 is accommodated. The housing 204 may comprise an upper housing part 204A and a lower housing part 204B which may be assembled while enclosing the loudspeaker 100. The assembled housing 204 may be an essentially closed housing with a sound outlet aperture 206. A part of the sound outlet aperture 206 may be formed in the upper housing part 204A and another part of the sound outlet aperture 206 may be formed in the lower housing part 204B. The loudspeaker 100 may be arranged within the housing 204 such that the sound outlet aperture 112 of the loudspeaker 100 is essentially aligned to the sound outlet aperture 206 of the housing 204, thus forming a common sound outlet aperture 112/206. In detail, an elastic sealing element 212, for example a ring-shaped rubber sealing, may be provided between an edge 210 of the sound outlet aperture 112 of the loudspeaker 100 and an edge 208 of the sound outlet aperture 206 of the housing 204. The elastic sealing element 212 may provide an airtight sealing between the edge 208 of the housing 204 and the edge 210 of the loudspeaker 100. Further support structures for supporting the loudspeaker 100 within the housing 204 may be provided in the housing 204. Rubber grommets 230A-D may be provided at contact points between the chassis 110 of the loudspeaker 100 and the housing 204. As a result, oscillations at the chassis 110 of the loudspeaker 100 may not be conducted to the housing 204 or may at least be significantly attenuated when being conducted to the housing 204. In the sound outlet aperture 112/206, a touch protection 226 may be provided, for example a grille, to prevent objects from entering the space between the first and second diaphragms 102, 108

The housing 204 may be made of any appropriate material, for example plastics, resin, metal like aluminum or steel or a composite material including carbon or glass fibers.

The housing 204 may be installed in a door of a vehicle. In a door panel of the door, an aperture matching to the sound outlet aperture 112/206 may be provided. The housing 204 may be arranged such that the sound outlet aperture 112/206 is aligned to the aperture in the door panel and a front gasket 228 may be provided between the edge 208 of the aperture 112/206 and an edge of the aperture in the door panel. The loudspeaker system 200 may provide a powerful sound, in particular at low frequencies, and requires little installation space only.

The invention claimed is:

1. A loudspeaker, comprising:

a first diaphragm;

a drive unit coupled to the first diaphragm and configured to drive the first diaphragm in a direction of excursion upon applying electrical energy to the drive unit;

a second passive diaphragm arranged opposing the first diaphragm, wherein the second passive diaphragm is mainly driven by sound waves emitted from the first diaphragm;

a housing providing a sound outlet aperture, the housing has a closed surface which circumscribes the sound outlet aperture of the housing, wherein the second passive diaphragm is arranged spaced apart from the first diaphragm, and wherein the sound generated within the housing is radiated through the sound outlet aperture only; and wherein a main direction of sound radiation is perpendicular to the direction of excursion of the first and second diaphragms.

2. The loudspeaker of claim 1, wherein the second passive diaphragm is not directly driven by an electromagnetic force.

3. The loudspeaker of claim 1, further comprising:

a distance between the second passive diaphragm and the first diaphragm is at least 10 mm, and wherein a height of the sound outlet aperture essentially corresponds to the distance between the second passive diaphragm and the first diaphragm.

4. The loudspeaker of claim 1, further comprising:

a distance between the second passive diaphragm and the first diaphragm is at most 300 mm, and wherein a height of the sound outlet aperture essentially corresponds to the distance between the second passive diaphragm and the first diaphragm.

5. The loudspeaker of claim 1, wherein an outer circumference of the first diaphragm extends in a first plane, an outer circumference of the second passive diaphragm extends in a second plane, and the first plane is parallel with respect to the second plane.

6. The loudspeaker of claim 1, wherein the second passive diaphragm is arranged with respect to the first diaphragm such that a projection of the second passive diaphragm along the direction of excursion at least partially overlaps the first diaphragm.

7. The loudspeaker of claim 1, wherein dimensions of an outer circumference of the first diaphragm are the same as dimensions of an outer circumference of the second passive diaphragm.

8. The loudspeaker of claim 7, wherein the outer circumference of the first diaphragm is offset from the outer circumference of the second passive diaphragm along a direction of excursion.

9. The loudspeaker of claim 1, further comprising a chassis supporting the first diaphragm, the second passive diaphragm, and the drive unit.

10. The loudspeaker of claim 9, wherein the chassis provides a sound outlet aperture that coincides with the sound outlet aperture of the housing, and an outer circumference of the sound outlet aperture extends in a plane parallel to a direction of excursion.

11. The loudspeaker of claim 10, wherein the chassis, the first diaphragm and the second passive diaphragm form a closed surface which circumscribes the sound outlet aperture of the housing.

12. The loudspeaker of claim 9, wherein the second passive diaphragm is mounted to the chassis via an elastic surround supporting the second passive diaphragm in a rest position, and the second passive diaphragm is movable in a direction of excursion against a restoring force of the elastic surround.

13. The loudspeaker of claim 1, wherein an outer circumference of the first diaphragm has an oval shape.

14. The loudspeaker of claim 1, wherein the second passive diaphragm further comprises a weight element at a center of the second passive diaphragm.

15. A loudspeaker system, comprising:

a housing providing a sound outlet aperture, the housing has a closed surface which circumscribes the sound outlet aperture; and a loudspeaker at the housing, the loudspeaker comprises:

a first diaphragm;

a drive unit coupled to the first diaphragm and configured to drive the first diaphragm in a direction of excursion upon applying electrical energy to the drive unit;

a second passive diaphragm arranged opposing the first diaphragm, wherein the second passive diaphragm is mainly driven by sound waves emitted from the first diaphragm;

wherein the second passive diaphragm is arranged spaced apart from the first diaphragm, and wherein the sound is radiated through the sound outlet aperture only; and wherein a main direction of sound radiation is perpendicular to the direction of excursion of the first and second diaphragms.

16. The loudspeaker system of claim 15, wherein the loudspeaker is elastically mounted at the housing.

17. The loudspeaker system of claim 15, wherein an edge of the sound outlet aperture of the housing is coupled to an edge of the loudspeaker via an elastic sealing element providing an airtight sealing between the edge of the sound outlet aperture of the housing and the edge of the loudspeaker.

18. The loudspeaker system of claim 15, wherein the housing is configured to be mountable at a vehicle component, and the vehicle component forms at least a part of the housing.

* * * * *